US012781879B2

(12) United States Patent
Dos Santos Manhaes Correa et al.

(10) Patent No.: US 12,781,879 B2
(45) Date of Patent: Nov. 3, 2026

(54) SUBSEA TERMINATION DEVICE AND METHOD

(71) Applicant: PETRÓLEO BRASILEIRO S.A.—PETROBRAS, Rio de Janeiro (BR)

(72) Inventors: Ygor Fernandes Dos Santos Manhaes Correa, Macaé (BR); Douglas Oliveira Correa De Souza, Macaé (BR); Andre Luiz Bevilaqua Santana, Macaé (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 442 days.

(21) Appl. No.: 18/462,319

(22) Filed: Sep. 6, 2023

(65) Prior Publication Data

US 2024/0084924 A1 Mar. 14, 2024

(30) Foreign Application Priority Data

Sep. 9, 2022 (BR) ...................... 10 2022 018073 3

(51) Int. Cl.

*F16L 1/26* (2006.01)
*B63G 8/00* (2006.01)

(Continued)

(52) U.S. Cl.

CPC ................ *F16L 1/26* (2013.01); *B63G 8/001* (2013.01); *B63G 8/04* (2013.01); *H02G 1/14* (2013.01)

(58) Field of Classification Search

CPC ... F16L 1/26; B63G 8/001; B63G 8/04; B63C 11/52; H02G 1/14; E21B 33/038; E21B 41/04

(Continued)

(56) References Cited

U.S. PATENT DOCUMENTS 3,961,490 A 6/1976 Corgnet
4,011,827 A 3/1977 Fond (Continued)

FOREIGN PATENT DOCUMENTS

BR 102018009685 11/2019
BR 202019012783 U2 12/2020

(Continued)

*Primary Examiner* — Benjamin F Fiorello

(74) *Attorney, Agent, or Firm* — Knobbe, Martens, Olson & Bear, LLP

(57) ABSTRACT

A device for actuation in the subsea environment, precisely in the termination, maintenance, repair or re-termination of umbilical cables through an ROV. By means of the proposed device, it becomes possible to correct the termination of subsea umbilicals without having to proceed with a saturation diving to take the required termination measures. The termination device is an assembly comprising: a base 1, which supports a pressing and termination structure 2, wherein the structure 2 is fed by a feeding path 3 and, the final assembly of these elements is transported, or handled, by an ROV through a handle 4. Additionally, a subsea termination method, comprising: previous preparation in surface; positioning in a subsea environment; preparation of the end of the hose to be terminated; positioning of the hose centrally to the termination device; pressing the connector suitable for the hose; tightness test, and terminated hose installation.

8 Claims, 8 Drawing Sheets

(51) Int. Cl.
*B63G 8/04* (2006.01)
*H02G 1/14* (2006.01)

(58) Field of Classification Search
USPC .......................................................... 114/314
See application file for complete search history.

(56) References Cited

U.S. PATENT DOCUMENTS

| | | | |
|---|---|---|---|
| 4,279,212 | A | 7/1981 | Lundberg |
| 4,858,346 | A | 8/1989 | Schulte |
| 4,890,567 | A | 1/1990 | Caduff |
| 5,080,530 | A | 1/1992 | Crawford |
| 5,199,194 | A | 4/1993 | Scott |
| 5,540,005 | A | 7/1996 | Lynch |
| 5,947,051 | A | 9/1999 | Geiger |
| 6,070,547 | A | 6/2000 | Achord |
| 6,317,387 | B1 | 11/2001 | D'Amaddio et al. |
| 6,543,965 | B2 | 4/2003 | Toth et al. |
| 7,381,328 | B2 | 6/2008 | Schrive |
| 7,905,192 | B1 | 3/2011 | Hertel, III |
| 7,971,547 | B1 | 7/2011 | Hertel, III et al. |
| 8,214,081 | B2 | 7/2012 | Choi et al. |
| 8,386,112 | B2 | 2/2013 | Rooney, III et al. |
| 8,794,251 | B2 | 8/2014 | Ostervold |
| 8,908,476 | B2 | 12/2014 | Chun et al. |
| 9,038,557 | B2 | 5/2015 | Smith |
| 9,180,934 | B2 | 11/2015 | Smith |
| 9,308,977 | B2 | 4/2016 | Andersen |
| 9,335,172 | B2 | 5/2016 | Lee |
| 9,434,456 | B2 | 9/2016 | HOjer |
| 9,440,717 | B2 | 9/2016 | Rooney, III et al. |
| 9,663,201 | B2 | 5/2017 | Sim et al. |
| 9,926,770 | B1 * | 3/2018 | Illakowicz ............... H02K 7/11 |
| 10,065,714 | B2 * | 9/2018 | Diesen .................... B63C 11/52 |
| 10,179,634 | B2 | 1/2019 | Van Rompay |
| 10,773,986 | B2 | 9/2020 | Biagini et al. |
| 11,073,448 | B1 | 7/2021 | Kelley |
| 2004/0265066 | A1 * | 12/2004 | Mackinnon ............... F16L 1/26 405/190 |
| 2009/0173677 | A1 | 7/2009 | Suera |
| 2009/0288836 | A1 * | 11/2009 | Goodall .............. E21B 33/0385 166/336 |
| 2012/0006352 | A1 | 1/2012 | Holappa et al. |
| 2013/0256113 | A1 | 10/2013 | Tumiatti |
| 2013/0298817 | A1 | 11/2013 | Holappa et al. |
| 2014/0116316 | A1 | 5/2014 | Fontaine |
| 2014/0230711 | A1 | 8/2014 | Lovelace et al. |
| 2015/0357845 | A1 | 12/2015 | Railey |
| 2017/0045489 | A1 | 2/2017 | Sauder |
| 2018/0297877 | A1 | 10/2018 | Lee |
| 2020/0254615 | A1 | 8/2020 | Bryner et al. |
| 2020/0325745 | A1 | 10/2020 | Suenaga et al. |
| 2023/0373603 | A1 | 11/2023 | Miller |
| 2024/0051645 | A1 | 2/2024 | Ligeiro Barbosa et al. |
| 2024/0059383 | A1 | 2/2024 | Ligeiro Barbosa et al. |
| 2024/0067548 | A1 | 2/2024 | Ligeiro Barbosa et al. |

FOREIGN PATENT DOCUMENTS

| | | |
|---|---|---|
| CN | 107907361 | 4/2018 |
| EP | 2 022 714 | 2/2009 |
| EP | 2 285 503 | 11/2018 |
| GB | 2528871 | 2/2016 |
| GB | 2582955 | 10/2020 |
| JP | 2008-018745 | 1/2008 |
| KR | 20150022458 | 6/2016 |
| KR | 101714704 B1 | 3/2017 |
| WO | WO 12/085880 | 6/2012 |
| WO | WO 18/061122 | 5/2018 |
| WO | WO 18/096214 | 5/2018 |
| WO | WO 19/012184 | 1/2019 |
| WO | WO 19/028562 | 2/2019 |
| WO | WO 19/170888 | 9/2019 |

* cited by examiner

SUBSEA TERMINATION DEVICE AND METHOD

FIELD OF APPLICATION

The present invention pertains to the field of tools to perform termination adjustments, repair, re-termination or maintenance of subsea umbilical cables. Especially, the present invention pertains to the field of devices and methodologies applied to the subsea environment through operations managed by means of an ROV, Remoted Operated Vehicle or Remotely Operated Vehicle.

STATE OF THE ART

Subsea umbilicals are complex and multifunctional cabling structures of vital importance for subsea production systems. The umbilical cables, or simply umbilicals, are in the form of flexible pipes or hoses, multilayered, designed for different functions, such as, for example, transmission of electrical and/or hydraulic energy, for the operation of subsea equipment, and for the transport of various fluids in support of subsea operations.

In general, a typical umbilical is formed by hoses, electrical cables, fiber optic cables and piping gathered in a flexible wired or unwired structure, provided with terminals for connections. The connections are inserted inside a coating, usually polymeric, generally assembled with a flange at its end.

For example, among the various functions that umbilicals can assume, their use for activating subsea safety valves, such as ESDV, Emergency Shutdown Valves, stands out. It should be noted that these valves are subsea check valves with the purpose of blocking the flow of fluids in pipes, fixed to a structure (Skid), with their actuation occurring through an umbilical coming from a Stationary Production Unit, SPU.

The ESDV valves have the main function of performing an emergency stop in hydrocarbon production. Therefore, it is possible to observe that maintaining the perfect functioning of the umbilicals is particularly relevant to avoid improper behaviors of the subsea system, which would unexpectedly and undesirably interrupt the current operation.

In the past, the repair or replacement of subsea umbilicals was carried out with saturation diving support. Saturation diving is a methodology that poses high risks to the safety of the professionals involved, and requires the adoption of notably onerous contracts, especially due to the daily cost of the naval resource involved, which is the DSV (Diving Support Vessel). In addition, environments with adverse natural conditions used to impair, or even make unfeasible, operations carried out with a DSV.

Further, regarding what is available in the state of the art related to the field of the present invention, document BR102018009685-0A2 can be seen, which describes equipment for sectioning pipes and umbilicals, allowing the cutting and separation into two parts, where the umbilical has its ends provided with tight terminations, allowing the maintenance and decommissioning thereof. The equipment in question suggests reducing the use of special resources such as PLSV (Pipe Laying Support Vessel) for operations in water depths above 300 m, as it allows the sectioning of flexible production lines with the presence of hydrocarbons, through a cutting mechanism, consisting of an articulated cutting blade (06), a hydraulic cylinder of the articulated cutting blade (08), guides and stop for the articulated cutting blade (11), and a connector for injection/return of washing fluid (37) (38), operated by ROV, which allow the tight separation of the parts, cleaning of the parts that will be in contact with the ocean, and removal of the contaminated fluid. However, when comparing document BR102018009685-0A2 with the present invention, it is possible to note that the use of a split jaw is not described in the document to execute the pressing of an umbilical hose, this jaw being positioned in the receiving/introduction portion of the hose. Furthermore, in said document, a connector terminal attachment portion is not available that allows the suitability between connector and hose to receive the appropriate connector, as in the invention. Finally, it is worth noting that, in a general aspect, the structure of document BR102018009685-0A2 is a clearly distinct structure, which leads to the conclusion that, starting from the document in question, a technician skilled on the subject would not achieve the present invention by simple or expected modifications, at least in face of the differences between the components of one design and another one, as well as the interaction between the constituent components of the present invention.

Document U.S. Pat. No. 6,543,965, in turn, describes an apparatus that has an elongated cable junction housing to be positioned aligned between two cables, for subsea installation. The housing has through holes at each end to receive the ends of the respective first and second cables, and the cables are each terminated in a respective connector in the housing to releasably connect the two ends of the cable. Each connector is pivotally and retractably mounted to the housing by a respective pivot link so that the connectors can be detached and rotated up out of the housing by an ROV for selective connection to other cables in a subsea network to allow for its branch as needed. Said document proposes to solve the difficulty of reconnecting or redistributing circuits when an electrical/optical cable system was previously installed on the ocean floor, without the need to pull numerous cables from miles deep in the ocean and, subsequently, separate and terminate the same cables by means of splicing on board a laying vessel, using installations. Specifically with respect to this document U.S. Pat. No. 6,543,965, despite describing that an ROV can separate and pull cable connectors easily attached to the new ends of the cables, the components of the described equipment do not find correspondence with the present invention.

In view of this scenario, with the objective of solving the deficiencies and limitations observed in operations with saturation diving, more and more ways are being developed to operate in the subsea environment with ROVs. Thus, operations with a diving support vessel give way to operations with vessels of the type RSV, ROV Support Vessel, or Operations Support Vessel with Remote Operation Vehicles. Although the operation in robotic form with the ROV takes longer when compared to the conventional version with saturation diving, the savings are significant with the reduction of financial costs and, in addition, it becomes possible to operate in more adverse environmental conditions such as, for example, a scenario with a significant wave height of up to 4 meters.

In this sense, it is the objective of the present invention to provide a device for operation in the subsea environment, through which an ROV can be operated to efficiently carry out repairs related to the re-termination of umbilical cables. By means of the proposed device, it becomes possible to correct the termination of subsea umbilicals in a less expensive way and with less limitation due to unstable environments, as observed in subsea cable re-termination operations performed by a diver in saturation diving.

BRIEF DESCRIPTION OF THE INVENTION

The present invention relates to a subsea termination device for performing operations of, for example, termination, maintenance, repair or re-termination of subsea umbilical cable hoses, wherein said device performs these operations when handled by an ROV through a handle. In a preferred embodiment, the termination device comprises a base that supports a pressing and termination structure, in turn, fed by a feeding path provided by the ROV.

In a preferred aspect, the base comprises a structure made of metallic material, with a rectangular base plate, preferably provided with three perforated portions equally spaced apart along its longitudinal length, and additionally comprising two parallel supports for two metallic columns of the pressing and termination structure, at the first end of the base plate. In addition, the base further comprises two parallel metallic columns, supporting a semicircle molded plate, in the middle portion of the base plate. Finally, the base comprises two metallic columns facing each other, supporting an upper plate at the second end of the base plate.

Further, in a particular way, the pressing and termination structure has a pressing end supported by the two metallic columns screwed to the two parallel supports of the base, as well as a metallic bar designed to be attached to the semicircle molded plate of the base, and a metallic block designed to be attached to the upper plate of the base.

In a preferably disclosed embodiment, the pressing and termination structure further comprises a hose receiving ring wherein two arms are enclosed in the form of parallel structures capable of moving in the direction of tightening a split jaw, which is attached in each split part to each arm, and the arms come from a connection with the metallic plate. In a particular aspect, in the ring also two movement strokes of a cylinder are enclosed, the two movement strokes being crossed by a connector terminal attachment block so that the two movement strokes parallelly pass through the block.

Particularly, the cylinder used is preferably a double-stage hydraulic cylinder, where the cylinder displacement operation is caused by hydraulic cycling from the hydraulic unit of the ROV through the feeding path, in the form of feeding terminals along the cylinder body. Meanwhile, preferably, the connector terminal attachment block has a hole in the center, facing the split jaw, and holds the connection containing the terminal to be inserted into the hose under maintenance.

Finally, still in the preferred embodiment of the invention, the handle is a metallic structure with a first portion contouring the cylinder in its intermediate middle region, and attached to the semicircle molded plate, while a second portion of the handle is attached by screws to the upper plate of the base.

In particular, additionally, the preferred embodiment of the invention provides for a subsea termination method, whereby operations of termination, maintenance, repair or re-termination are carried out on subsea umbilical cable hoses by means of an ROV handling a subsea termination device, wherein the method comprises a step a) of 'Previous preparation in surface', where the selection of the connector that will be applied to the hose takes place and the arrangement of the selected connector in the connector terminal attachment block with the equipment still in surface, by using, preferably, a quick coupling tool.

A step b) is additionally provided for, of 'b) Positioning in a subsea environment', where the ROV is driven to the seabed to the place where maintenance of the umbilical is required, in possession of the termination device and, additionally, in possession of a cutting tool.

In a step c), of 'Preparation of the end of the hose to be terminated', the ROV proceeds with the uniform cut, preferably at 900 in relation to the surface of the hose and, in sequence, a step d) executes the 'Positioning the hose centrally to the termination device' until it finds the pre-assembled interfaced hydraulic connections in step a). Further, preferably, in step e), the ROV energizes a piston and causes the tensioning of a split jaw in the direction of pressing the hose.

Finally, the preferred embodiment of the invention, which is not limiting, provides for steps f) and g), of tightness test and installation of the tight identified hose, providing that the system to which the umbilical under maintenance belongs returns to the normal operation.

DETAILED DESCRIPTION OF THE INVENTION

The present invention provides a device for actuation in the subsea environment, precisely in the termination, maintenance, repair, or re-termination of umbilical cables through an ROV. By means of the proposed device, it becomes possible to correct the termination of subsea umbilicals without having to proceed with a saturation diving to take the required termination measures.

Figure 1:
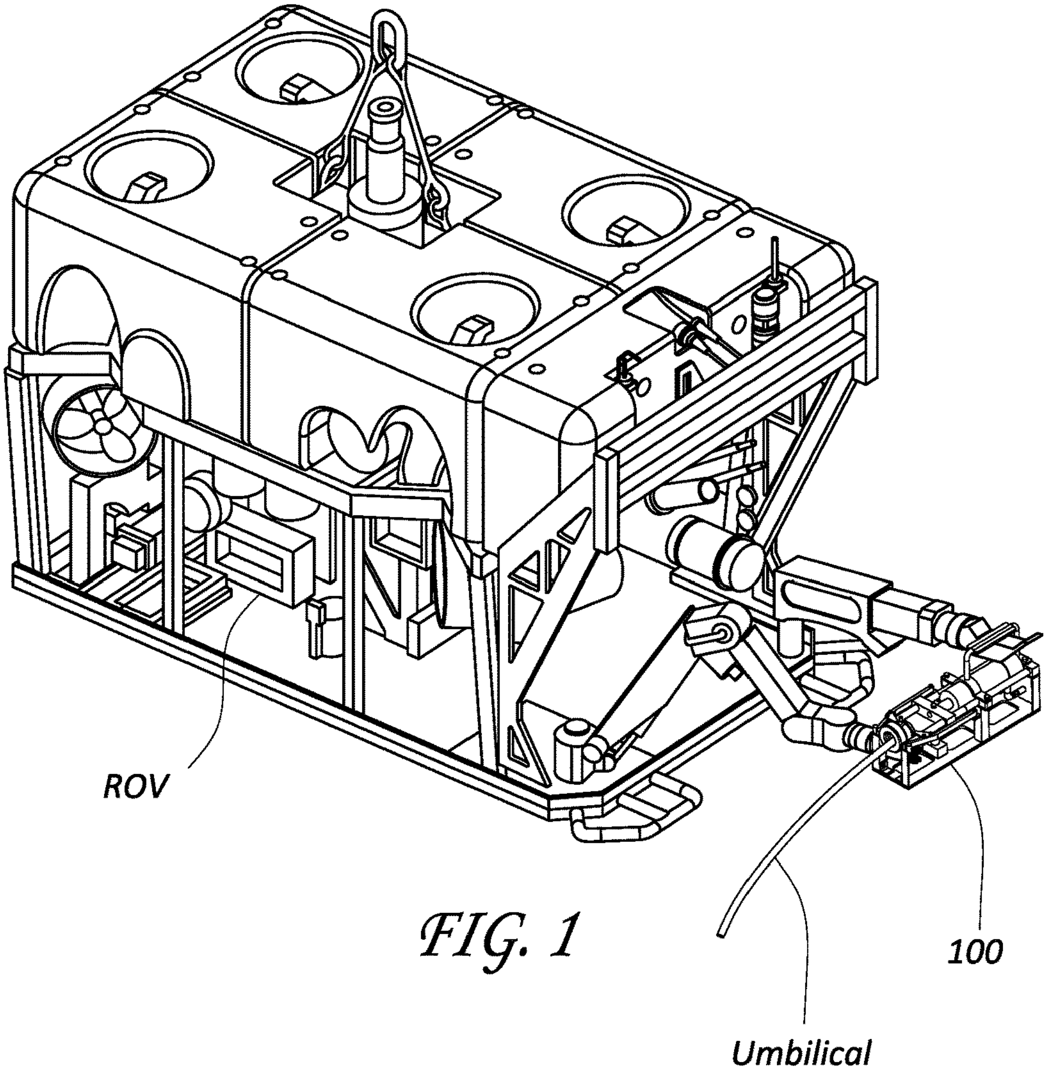
FIG. 1 is a representative graphic illustration of an ROV handling the termination device of the present invention.
Figure 2:
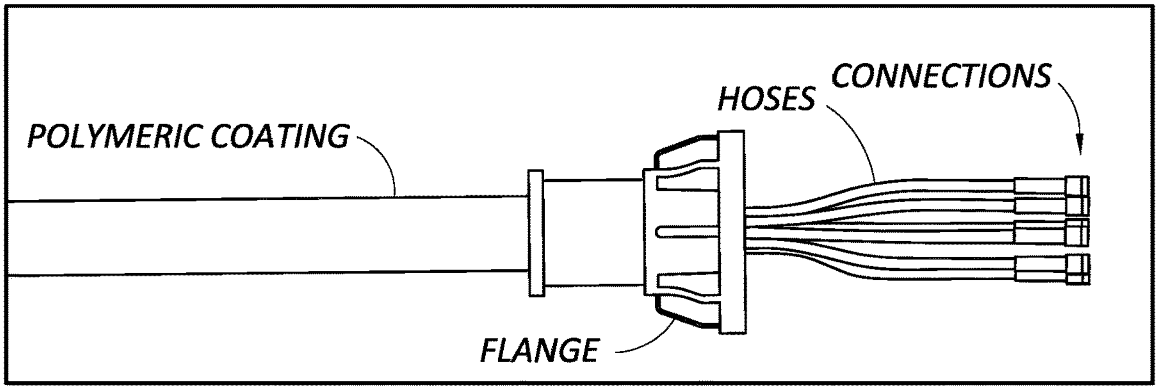
FIG. 2 is an illustrative graphic representation of a hydraulic umbilical, wherein the elements usually components of an umbilical can be observed, precisely, the polymeric coating, the flange, the hoses and the connections.
Figure 3:
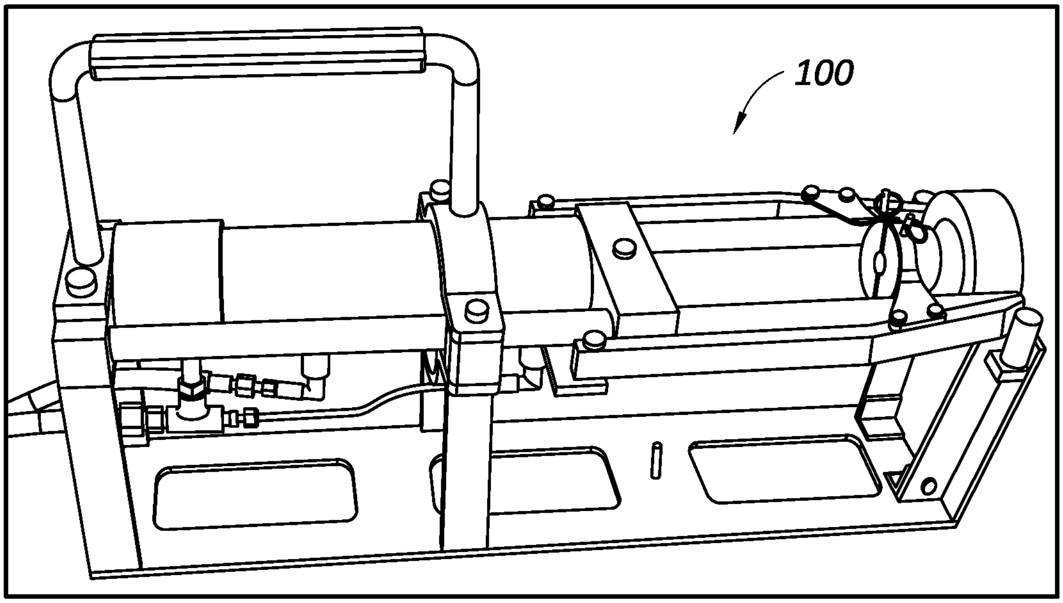
FIG. 3 is an illustrative photograph of the termination device of the present invention.
Figure 4A:
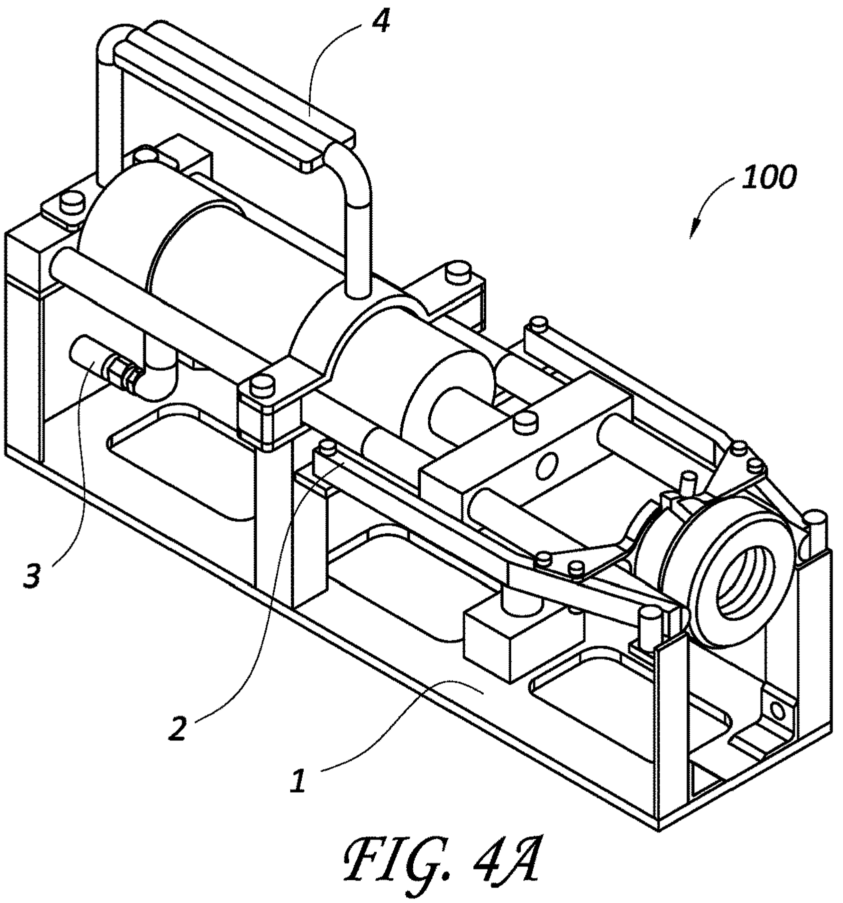
FIG. 4A is a graphical representation of the termination device of the present invention, in perspective.
Figure 4B:
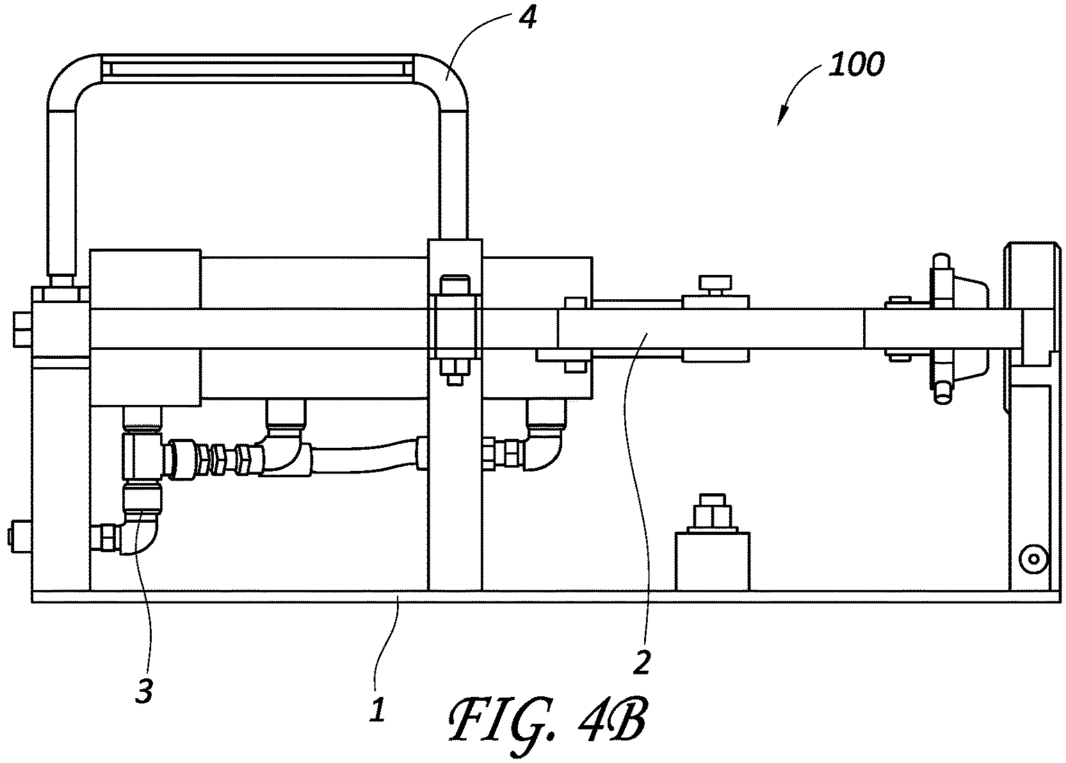
FIG. 4B is a graphical representation of the termination device of the present invention, in side view.

As seen in FIG. 4, in short, the termination device 100 of the present invention is presented in an assembly condition comprising: a base 1, which supports a pressing and termination structure 2, wherein the structure 2 is fed by a feeding path 3 and the final assembly of these elements is transported, or handled, by an ROV through a handle 4. For a perfect understanding of the invention, each of these component elements and their interconnections will be presented in detail in the following lines.

Figure 5A:
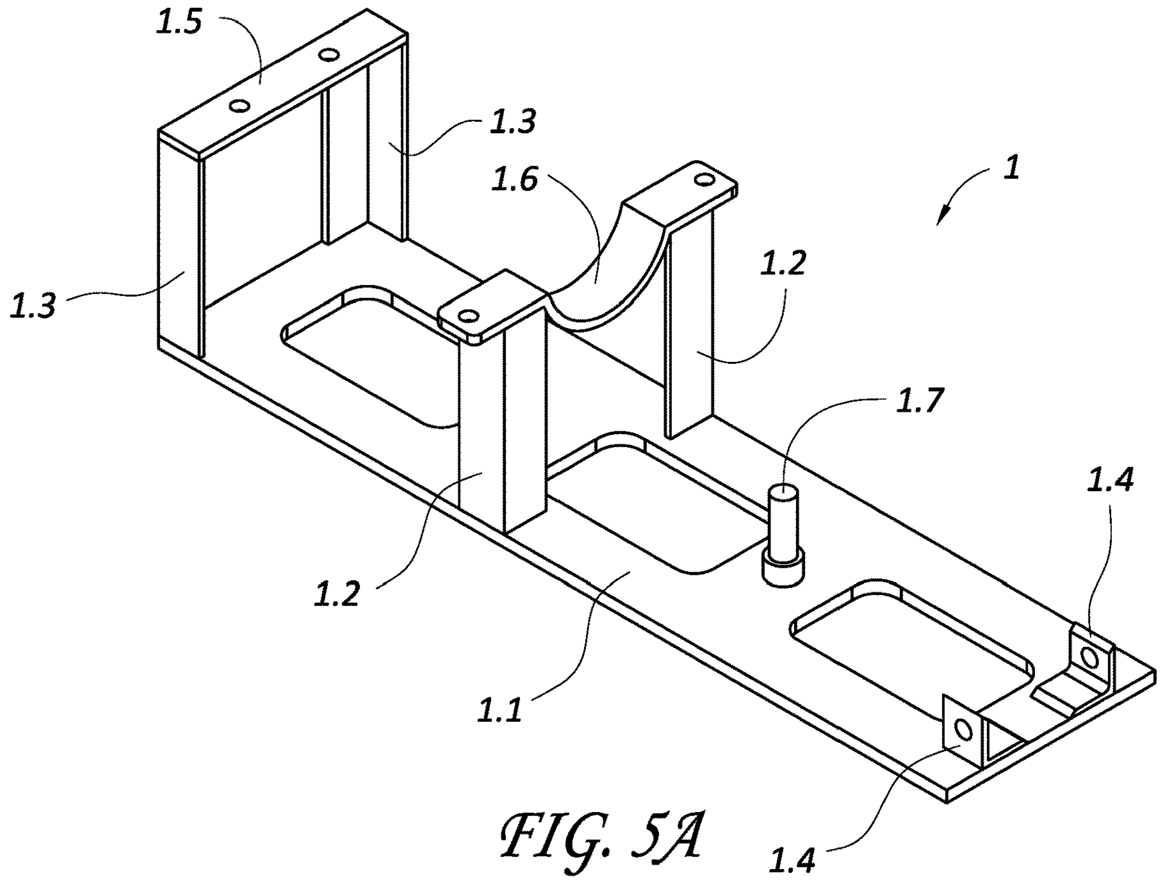
FIG. 5A is a graphical representation of the base of the termination device of the present invention, in perspective.
Figure 5B:
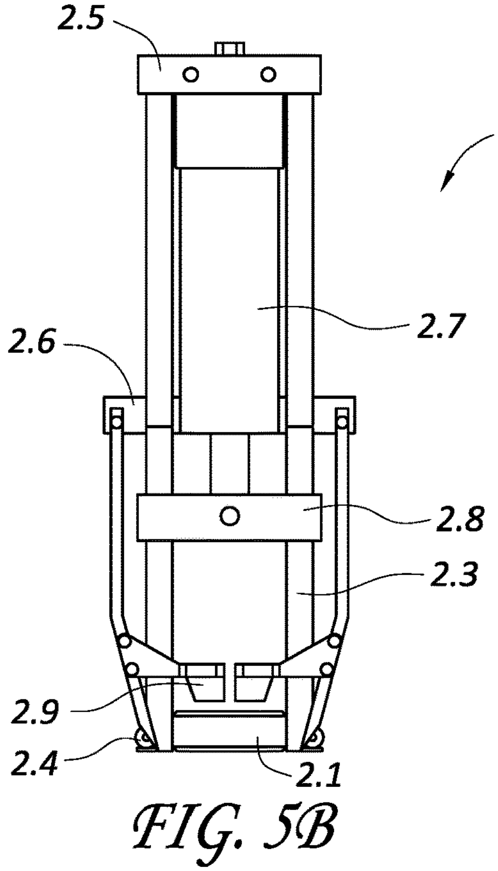
FIG. 5B is a graphical representation of the support and pressing structure of the termination device of the present invention, in perspective.

FIG. 5 illustrates the base element 1 of the invention. The base 1 comprises a structure preferably made of metallic material. More precisely, the base 1 comprises a rectangular base plate 1.1, preferably provided with three perforated portions equally spaced apart along its longitudinal length. A first end of the base plate 1.1 has two parallel supports 1.4 for screw connection, which will receive two metallic columns from the pressing and termination structure 2, these columns being arranged close to the jaws of the structure 2, not illustrated in this FIG. 5. Additionally, in first portion, between two of the three holes in the base plate 1.1, a screw 1.7 is arranged, with the purpose of fixing the sacrificial anode in the base 1. This cathodic protection is a technique used to protect the metallic device from corrosion. Next, in the middle portion of the length of the base plate 1.1, two parallel metallic columns 1.2 are arranged, one in front of the other, mirrored, supporting a semicircle molded plate 1.6 by screws. Finally, at the second end with reference to the length of the base plate 1.1, two other metallic columns 1.3 support an upper plate 1.5. For reference purposes, an exemplary measurement for base 1 is: 708 mm×187 mm×160 mm (L×W×H). However, it is clearly visualized by a technician in the subject that this measure is merely illustrative, and the device can be perfectly adapted to any other order of values to meet the necessary demand.

FIG. 5.1 illustrates the pressing and termination structure 2, in top view. Upon analyzing this FIG. 5.1 together with FIG. 5, it is possible to note that the pressing and termination structure 2 is received as a mask over the base 1. In a particular and precise way, as a mask, it is understood that the structure 2 has a pressing end 2.4 designed to be supported through the two metallic columns bolted to the two parallel supports 1.4 of the base 1. The structure 2 also has a metallic bar 2.6 in its intermediate portion designed to be screwed into the semicircle molded plate 1.6 of the base 1. The structure 2 still has a second end, in the form of a metallic block 2.5 provided with two holes for the arrangement of screws coinciding with the upper plate 1.5 of the base 1. Additionally, to perfectly describe the pressing and termination structure 2, it should be noted that this comprises the active portion of the device. That is, this is the portion of the device that actually performs the pressing of the umbilical hose to be terminated, which retains the connector to be used in the termination, and completes the termination of the hose. In this sense, the additional component elements of structure 2 will be detailed below.

Figure 7:
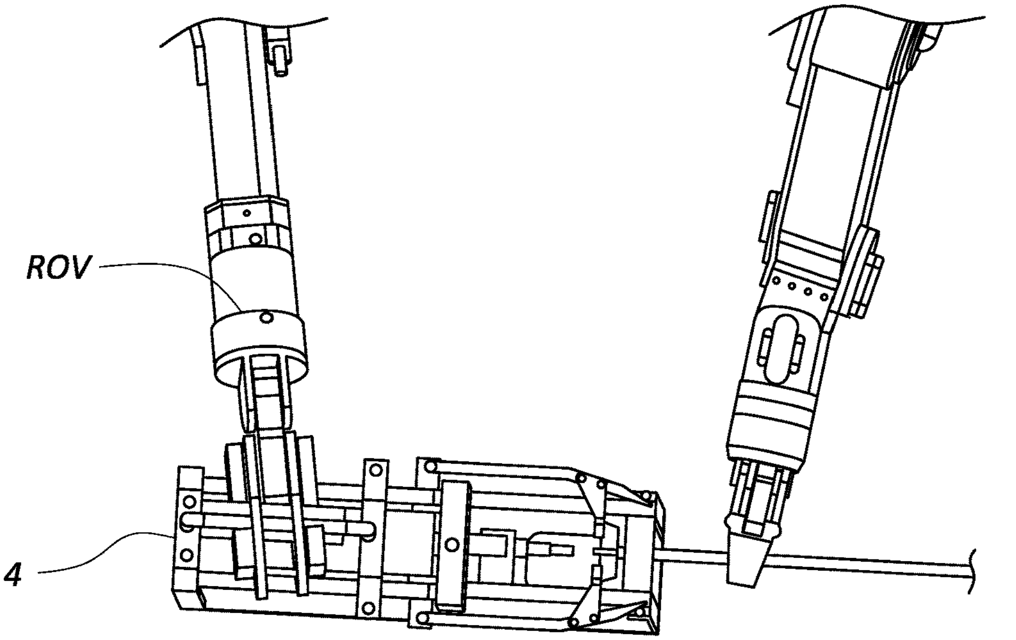
FIG. 7 is a graphical representation of the ROV positioning a hose, to be terminated, in the device of the present invention.
Figure 8:
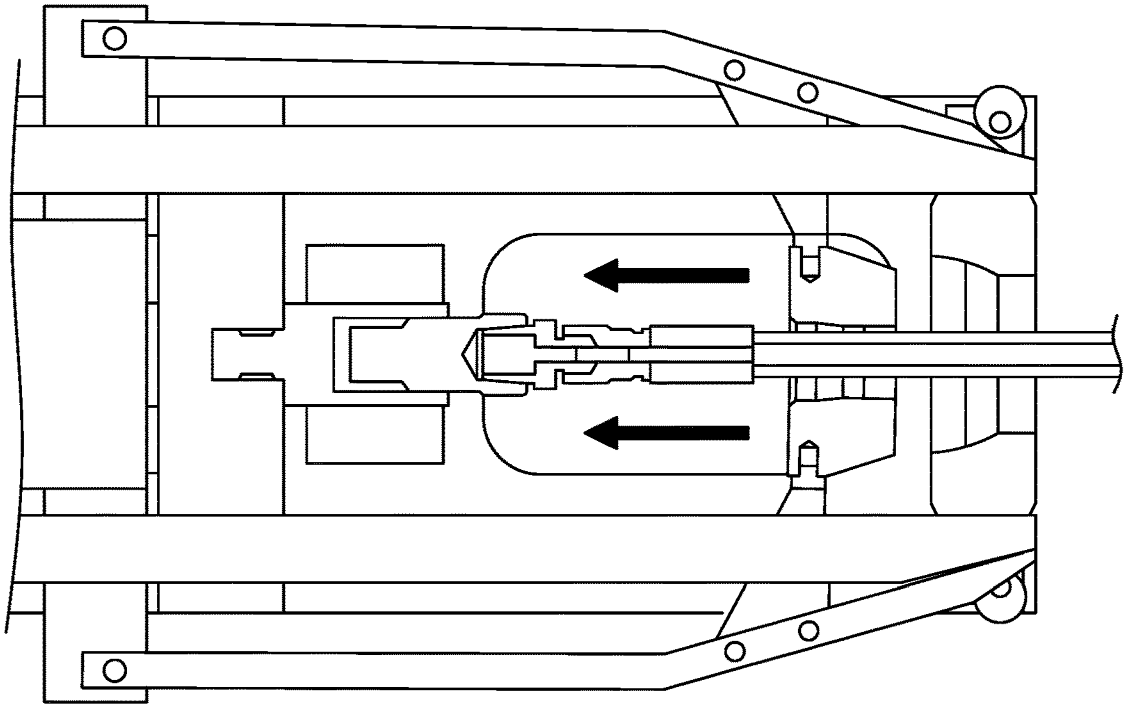
FIG. 8 is a graphic representation of the hose to be terminated, at this point already close to the corresponding termination, illustrating the series connection provided by the device of the present invention.
Figure 9:
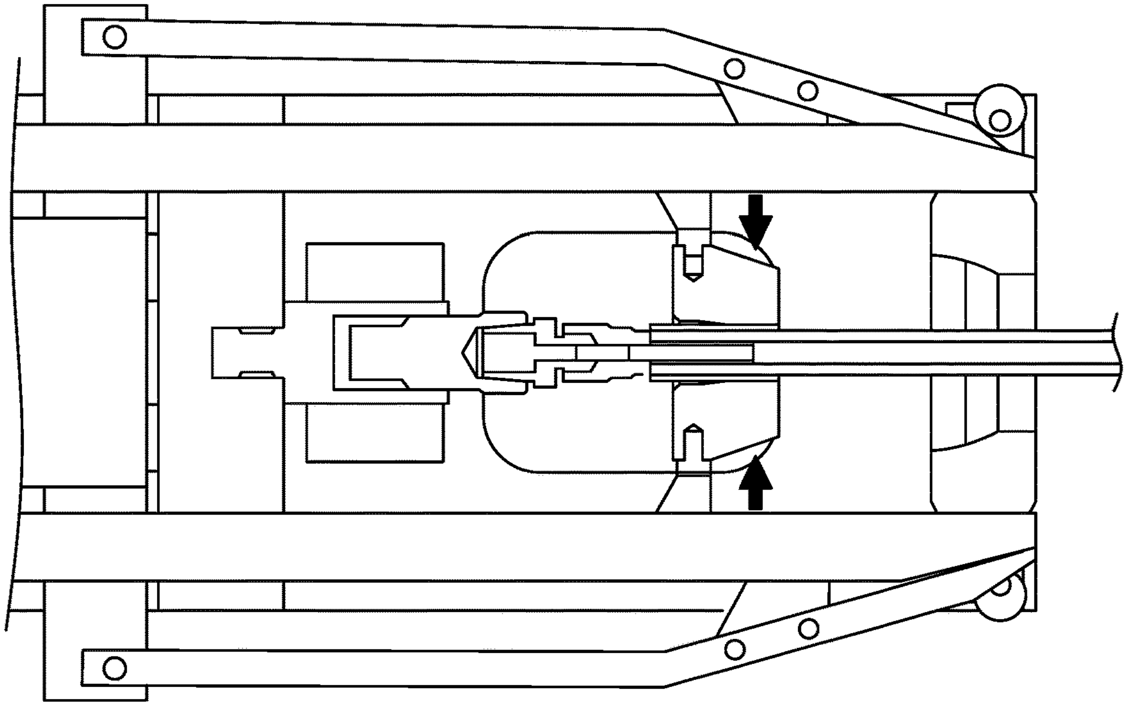
FIG. 9 is a graphic representation of the hose to be terminated, positioned in series with the termination to be fixed, prior to the pressing movement performed by the two jaws in the device of the present invention.

The pressing and termination structure 2 receives the hose to be terminated in its central portion. Precisely, the structure 2 has a hose receiving ring 2.1, at its first end, through which the ROV introduces the hose into the device of the invention. Reference is made to FIGS. 7 and 8, which are representative of this introduction. Two arms 2.2 are enclosed in this hose receiving ring 2.1, which are parallel metallic structures designed to move in the direction of tightening a split jaw 2.9, and which come from a screw connection with a metallic plate 2.6. Reference is made to FIG. 9 representing the tightening movement, as mentioned. For this, each of the arms 2.2 is attached to each of the split parts of the split jaw 2.9. By way of example, a split jaw 2.9 that fits well with equipment of this order of magnitude would be a jaw that would make it possible to re-terminate hoses with gauges between 16 and 32 mm. Also, in ring 2.1, two movement strokes 2.3 of a cylinder 2.7 are enclosed. The cylinder 2.7 is preferably a double-stage hydraulic cylinder, made of a metallic material, for example, carbon steel with stainless steel parts, adapted for use in a subsea environment. The displacement of this cylinder causes movement capable of terminating the hydraulic connector next to the hose. To make the description even more illustrative, note that the hydraulic actuation of the device of the invention allows the metallic plate 2.6, the arms 2.2, and the split jaw 2.9, which are integral with each other, to move towards the ring 2.1. When the first stage of cylinder 2.7 reaches the advance limit, it causes the split jaw 2.9 to close and seat next to the stop in the form of ring 2.1. In the second stage of the cylinder, when activated, advances element 2.8 (described below) towards ring 2.1. At this point, considering the interfaced hose and connector, the metallic terminal is crimped.

Figure 6:
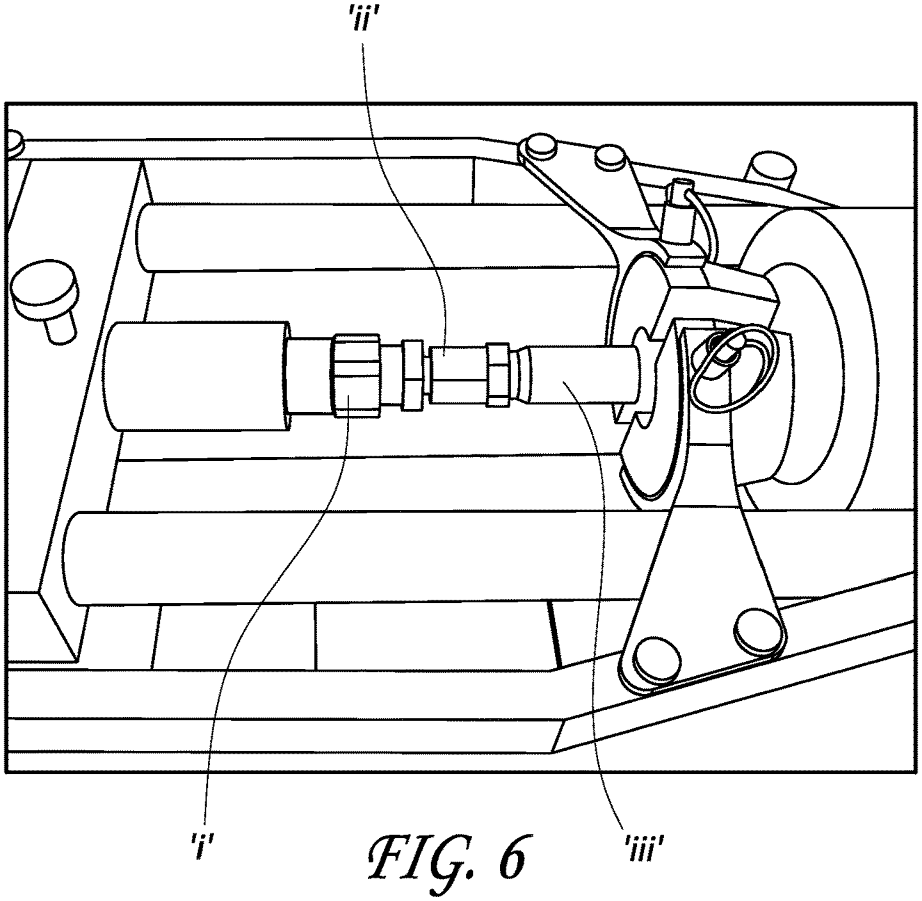
FIG. 6 is a photograph to indicate the detail of a quick coupling, with an NPT adapter and a female JIC metallic terminal, assembled by the termination device of the present invention.

Additionally, crossing the two movement strokes 2.3, a connector terminal attachment block 2.8 is disposed. The two movement strokes 2.3 pass through block 2.8 in parallel. The connector terminal attachment block 2.8 has a hole in the center, facing the split jaw 2.9 and, consequently, the hose receiving ring 2.1. Therefore, it should be noted that block 2.8 is the element that temporarily holds the connection containing the terminal to be inserted in the hose under maintenance. It is relevant to note here that, in order to accurately and adequately terminate the umbilical hose under maintenance, a previous assembly/repair of the block 2.8 is proposed, still in surface, prior to the launch of the ROV. In practice, still on the RSV deck, the connector must be mounted on the block 2.8 according to the model and gauge of the hose to be pressed. By way of illustration, it can be mentioned that the type of hydraulic connector/interface will depend on each operating case. Subsea hoses are generally JIC 4, 6 or 8 type. However, this type of connection may present resistance in use for ROV; in this way, it is generally suggested to adapt a flat face quick coupling type connector, since this connector is of the "plug and play" type and facilitates handling by the ROV. FIG. 6 exemplifies an assembled connection, wherein, as a non-limiting example, there is disclosed the use of NPT, JIC and "quick coupling" type hydraulic connections assembled in series to facilitate the handling and coupling of hydraulic interfaces when using the ROV.

It should be noted that for the operation of displacement of the cylinder and resulting pressing, the use of hydraulic cycling of 1000 psi (6.895 MPa) provided by the hydraulic unit of the ROV was established. However, this is an exemplary version, and adjustments are expected to generate different values, keeping the same concepts involved. FIG. 4 illustrates an example of the feeding path 3 of the device of the invention, where it is possible to observe the distribution of feeding terminals along the cylinder body 2.7, originating from a connection with the ROV.

Resuming the reference to FIG. 4, it can be seen the handle 4, which is a metallic structure, wherein a first portion contours the cylinder 2.7 in its intermediate middle region, being screwed to the semicircle molded plate 1.6.

Meanwhile, a second portion of this handle 4 is attached by screws to the upper plate 1.5 of the base 1.

Having described the component elements of the device of the present invention, in an illustrative and exemplary manner, in the preferred and non-limiting embodiment, the method of operation of the device will be described below, by which the technical solution for termination, maintenance or re-termination is achieved of umbilical hoses, also object of the invention.

In this sense, to perform the termination of a hose of a subsea umbilical in a remote operation, through the ROV, dispensing with saturation diving and the mandatory equipment that saturation diving demands, the present invention additionally discloses a termination method, comprising the steps of:

a) Previous preparation in surface;

b) Positioning in a subsea environment;

c) Preparation of the end of the hose to be terminated;

d) Positioning the hose centrally to the termination device;

e) Pressing the connector suitable for the hose;

f) Tightness test, and g) Terminated hose installation.

The step a), of previous preparation in surface, comprises the selection of the connector that will be applied to the hose of a given umbilical. In particular, said selection considers the model and gauge of the hose. Once the appropriate connector has been selected for the maintenance in question, this connector is pre-assembled in the connector terminal attachment block 2.8 with the equipment still in surface, using a quick coupling tool. FIG. 6 is a photograph that aims at bringing as an example the quick coupling tool 'i', where an NPT-JIC male adapter 'ii' is engaged, followed by a metallic JIC female terminal 'iii', selected as suitable for the exemplary operation.

In the step b), of positioning in a subsea environment, the ROV is driven to the bottom of the sea, to the place where maintenance of the umbilical is required, in possession of the device of the present invention in the pre-assembly position, as provided in step a), and, additionally, in possession of a commercially available cutting tool of the guillotine type.

Figure 10:
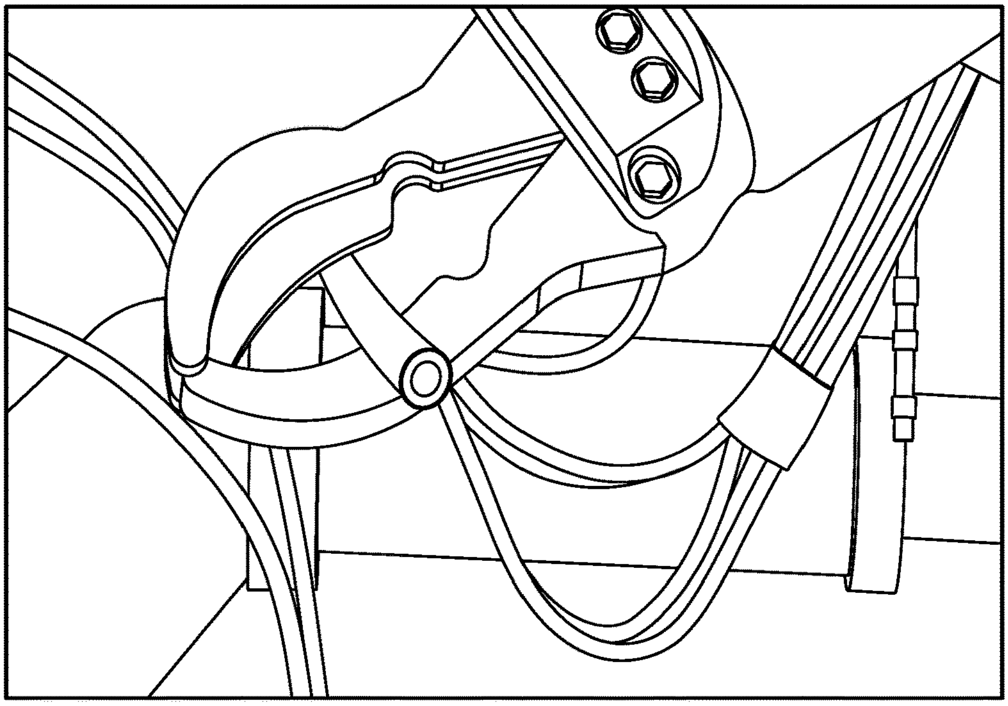
FIG. 10 is a demonstrative photograph of a cut umbilical hose, according to step c) of the method of the present invention.
Figure 11:
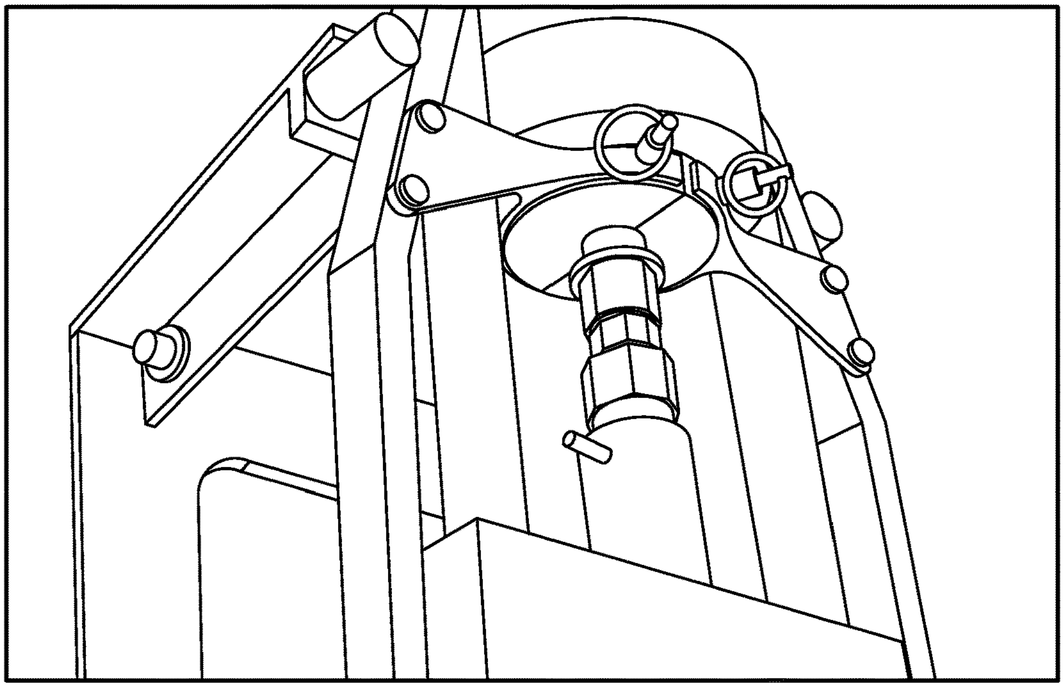
FIG. 11 is a photograph demonstrating the pressing of jaws in the device of the present invention.
Figure 12:
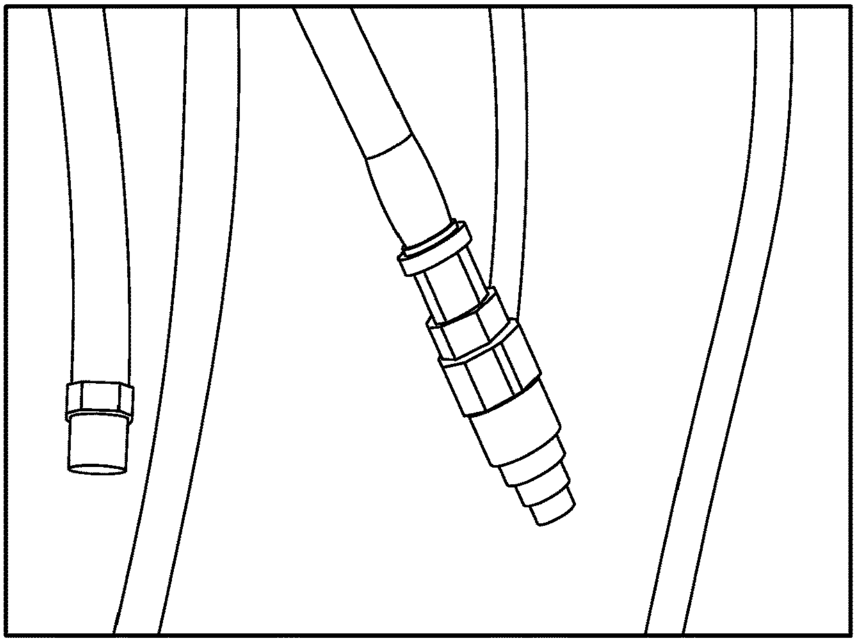
FIG. 12 is a photograph of the connector pressed to the hose, that is, the complete cable termination, in the process of testing tightness.
Figure 13:
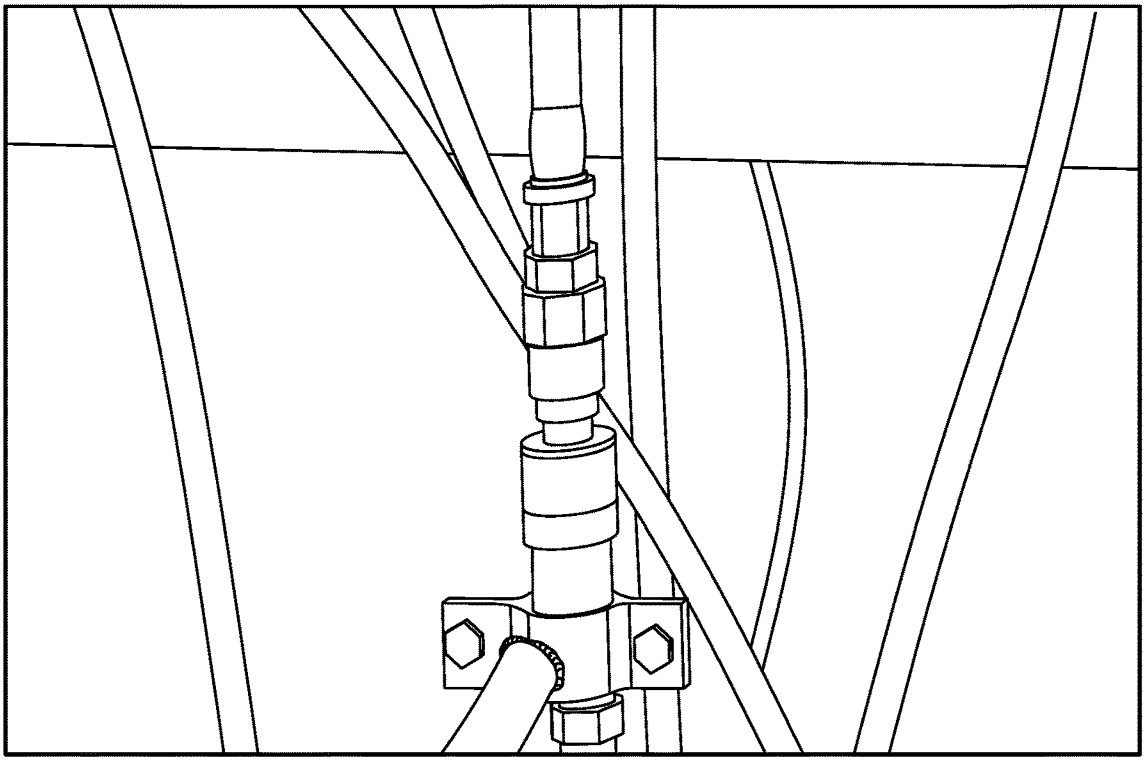
FIG. 13 is a photograph of the terminated hose, connected to the subsea equipment under maintenance.

In the step c), the ROV positions the cutting tool next to the section of hose that will be reconditioned, and executes the cut, aiming at the subsequent crimping of the hydraulic connector. After the correct fixation of the hose next to the cutting tool, guillotine, the ROV proceeds with the uniform cut. It should be noted that, at this step, it is essential that the cut be made as close to 90° in relation to the surface of the hose as possible, in order to contribute to the correct pressing of the metallic terminal. FIG. 10 shows a photograph demonstrating the cut performed in accordance with this step c).

The step d), of positioning the hose centrally to the termination device, comprises the part of the process in which the ROV directs the hose through the available path through the hose receiving ring 2.1 and the split jaw 2.9, until the interfaced hydraulic connections, pre-assembled in step b), are found.

Thus, next, in the step e) of pressing the connector suitable for the hose, once the hose is inserted in the device of the invention, the ROV starts pressurizing for energizing, which generates the advance of the piston 2.7 and causes the tensioning of the split jaw 2.9. Initially, the initial pressure of 1000 psi (6.895 MPa) is expected. However, if, when analyzing the pressing of the metallic terminal next to the hose, it is verified the need of repeating the processing, a new cycle of pressing with 1000 psi (6.895 MPa) of pressure can be performed.

In sequence, the step f) comprises the tightness test of the hose in order to guarantee the operational success of the termination carried out on the hose. Once the tightness has been verified, there is the execution of the next step. On the other hand, if the tightness is not verified, a new termination procedure can be carried out, or the verification of eventual problems that may have influenced the failure of the necessary maintenance.

Finally, in the step g), there is the terminated hose installation, and the system returns to the normal operation.

The descriptions proposed herein are intended to technically report the invention in terms of an exemplary embodiment. Nevertheless, it should be clear to a technician skilled on the subject that, while maintaining the new and inventive features of the invention, modifications may be additionally proposed, which are still encompassed by the same scope defined and claimed herein.

The invention claimed is:

1. A remotely operated vehicle (ROV) operated device for termination, maintenance, repair or re-termination of subsea umbilical cable hoses, the device comprising:

a handle;

a base plate having a rectangular base plate, and three perforated portions equally spaced apart along a longitudinal length, a pressing and termination structure comprising two parallel supports supported at a first end of the base plate, a feeding path for feeding the pressing and termination structure;

a semicircular molded plate; and two parallel metallic columns disposed facing each other and supporting the semicircular molded plate.

2. The device according to claim 1, further comprising two metallic columns facing each other and supporting an upper plate at a second end of the base plate.

3. The device according to claim 2, wherein the pressing and termination structure has a pressing end supported by the two metallic columns, the two metallic columns being screwed onto the two parallel supports at the first end of the base plate;

a metallic bar attached to the semicircular molded plate of the base plate; and a metallic block attached to the upper plate of the base plate.

4. The device according to claim 3, wherein the pressing and termination structure further comprises:

a hose receiving ring wherein two arms are enclosed, the two arms being parallel structures configured to move in a direction of tightening a split jaw attached in each split part to each arm, and the two arms extending from the metallic bar;

wherein two movement strokes of a cylinder are also enclosed in the hose receiving ring, the two movement strokes being crossed by a connector terminal attachment block so that the two movement strokes pass through the connector terminal attachment block.

5. The device according to claim 4, wherein the cylinder is a double-stage hydraulic cylinder, wherein a cylinder displacement operation is configured to be caused by hydraulic cycling from a hydraulic unit of the ROV through the feeding path via feeding terminals along a body of the cylinder.

6. The device according to claim 4, wherein the connector terminal attachment block has a hole in a center, facing the split jaw, and comprises a connector terminal configured to be inserted into a hose under maintenance.

7. The device according to claim 1, wherein the handle is a metallic structure with a first portion contouring a cylinder at an intermediate middle region of the cylinder, and attached to a semicircle molded plate, wherein a second portion of the handle is attached by screws to an upper plate of the base plate.

8. A remotely operated vehicle (ROV) operated device for termination, maintenance, repair or re-termination of subsea umbilical cable hoses, the device comprising:

a handle;

a base plate, a pressing and termination structure connected to the base plate, and a feeding path for feeding the pressing and termination structure;

wherein the handle is a metallic structure with a first portion contouring a cylinder at an intermediate middle region of the cylinder, and attached to a semicircle molded plate, wherein a second portion of the handle is attached by screws to an upper plate of the base plate.

* * * * *